United States Patent
Yada et al.

(10) Patent No.: US 9,300,008 B2
(45) Date of Patent: Mar. 29, 2016

(54) SOLID ELECTROLYTE MATERIAL, LITHIUM BATTERY, AND METHOD OF PRODUCING SOLID ELECTROLYTE MATERIAL

(75) Inventors: Chihiro Yada, Susono (JP); Shoji Yokoishi, Mishima (JP); Brian Elliott Hayden, Lyndhurst (GB); Thierry Le Gall, Southampton (GB); Duncan Clifford Alan Smith, Bitterne Park (GB); Christopher Edward Lee, Southampton (GB)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 797 days.

(21) Appl. No.: 13/512,649

(22) PCT Filed: Apr. 13, 2010

(86) PCT No.: PCT/JP2010/056604
§ 371 (c)(1),
(2), (4) Date: May 30, 2012

(87) PCT Pub. No.: WO2011/128976
PCT Pub. Date: Oct. 20, 2011

(65) Prior Publication Data
US 2012/0237835 A1  Sep. 20, 2012

(51) Int. Cl.
*H01M 10/0562* (2010.01)
*H01M 10/052* (2010.01)
(Continued)

(52) U.S. Cl.
CPC ............. *H01M 10/052* (2013.01); *H01B 1/122* (2013.01); *H01M 4/485* (2013.01); *H01M 4/505* (2013.01);
(Continued)

(58) Field of Classification Search
CPC ................. H01M 10/0562; H01M 2300/0068; H01M 2300/0071
USPC .................... 429/465, 479, 491, 301
See application file for complete search history.

(56) References Cited

U.S. PATENT DOCUMENTS

2004/0018424 A1* 1/2004 Zhang et al. ................. 429/162
2004/0058237 A1* 3/2004 Higuchi et al. .............. 429/209
(Continued)

FOREIGN PATENT DOCUMENTS

CN        101322279 A    12/2008
JP        2007 101536    4/2007
(Continued)

OTHER PUBLICATIONS

English Translation of JP-2008-59843.*
(Continued)

*Primary Examiner* — Stewart Fraser
(74) *Attorney, Agent, or Firm* — Oblon, McClelland, Maier & Neustadt, L.L.P.

(57) ABSTRACT

A main object of the present invention is to provide a Li—La—Ti—O based solid electrolyte material having high Li ion conductivity in the crystal grain boundary. The present invention attains the object by providing solid electrolyte material represented by a general formula: $Li_{3x}(La_{(2/3-x)-a}M1_a)(Ti_{1-b}M2_b)O_3$, wherein "x" is $0<x<0.17$; "a" is $0 \leq a \leq 0.5$; "b" is $0 \leq b \leq 0.5$; "M1" is at least one selected from the group consisting of Sr, Na, Nd, Pr, Sm, Gd, Dy, Y, Eu, Tb, and Ba; and "M2" is at least one selected from the group consisting of Mg, W, Mn, Al, Ge, Ru, Nb, Ta, Co, Zr, Hf, Fe, Cr, and Ga, and wherein the solid electrolyte material is a crystalline material, is in thin film form, and has a thickness of 250 nm to 850 nm.

20 Claims, 4 Drawing Sheets

(51) Int. Cl.
- *H01B 1/12* (2006.01)
- *H01M 4/485* (2010.01)
- *H01M 4/505* (2010.01)
- *H01M 4/525* (2010.01)

(52) U.S. Cl.
CPC .......... *H01M 4/525* (2013.01); *H01M 10/0562* (2013.01); *H01M 2300/0068* (2013.01); *H01M 2300/0071* (2013.01); *Y02E 60/122* (2013.01); *Y02T 10/7011* (2013.01)

(56) References Cited

U.S. PATENT DOCUMENTS

| | | |
|---|---|---|
| 2008/0053827 A1 | 3/2008 | Ota |
| 2009/0047577 A1 | 2/2009 | Iwamoto et al. |

FOREIGN PATENT DOCUMENTS

| | | |
|---|---|---|
| JP | 2008 59843 | 3/2008 |
| JP | 2009 215130 | 9/2009 |
| JP | 2009 238704 | 10/2009 |
| WO | WO 2008153564 | * 12/2008 |

OTHER PUBLICATIONS

Ahn, J.K., et al., "Characteristics of perovskite ($Li_{0.5}La_{0.5}$)$TiO_3$ solid electrolyte thin films grown by pulsed laser deposition for rechargeable lithium microbattery," Electrochimica Acta, vol. 50, pp. 371-374, (2004).

International Search Report Issued Jul. 13, 2010 in PCT/JP10/56604 Filed Apr. 13, 2010.

TJ. Boyle et al., "All-ceramic thin film battery", SAND 2002-3615 (53 pages).

* cited by examiner

SOLID ELECTROLYTE MATERIAL, LITHIUM BATTERY, AND METHOD OF PRODUCING SOLID ELECTROLYTE MATERIAL

TECHNICAL FIELD

The present invention relates to a Li—La—Ti—O based solid electrolyte material having high Li ion conductivity in the crystal grain boundary.

BACKGROUND ART

In accordance with a rapid spread of information relevant apparatuses and communication apparatuses such as a personal computer, a video camera and a portable telephone in recent years, the development of a battery to be utilized as a power source thereof has been emphasized. The development of a high-output and high-capacity battery for an electric automobile or a hybrid automobile has been advanced also in the automobile industry. A lithium battery has been presently attracted attention from the viewpoint of a high energy density among various kinds of batteries.

Liquid electrolyte containing a flammable organic solvent is used for a presently commercialized lithium battery, so that the installation of a safety device for restraining temperature rise during a short circuit and the improvement in structure and material for preventing the short circuit are necessary therefor. On the contrary, a lithium battery all-solidified by replacing the liquid electrolyte with a solid electrolyte layer is conceived to intend the simplification of the safety device and be excellent in production cost and productivity for the reason that the flammable organic solvent is not used in the battery.

A Li—La—Ti—O based solid electrolyte material (LLT) has been known as a solid electrolyte material used for an all solid state lithium battery. For example, in Non Patent Literature 1, an amorphous thin membrane of $Li_{0.5}La_{0.5}TiO_3$ is disclosed. The composition of this thin membrane corresponds to the case of x=0.17 in a general formula: $Li_{3x}La_{2/3-x}TiO_3$. Also, in Patent Literature 1, a solid electrolyte membrane having lithium ion conductivity is disclosed, which has a composition of $La_XLi_YTi_ZO_3$ ($0.4 \leq X \leq 0.6$, $0.4 \leq Y \leq 0.6$, $0.8 \leq Z \leq 1.2$, Y<X) and an amorphous structure. This composition range differs completely from a composition range of $Li_{3x}La_{2/3-x}TiO_3$.

Also, in Patent Literature 2, a solid electrolyte layer composed of a solid electrolyte including a complex oxide containing Li, La and Ti is disclosed, in which the solid electrolyte layer comprises an amorphous layer, a crystalline layer, and a lattice defect layer. In addition, in Patent Literature 2, it is described that the composition of a solid electrolyte material is preferably $La_{2/3-x}Li_{3x}TiO_3$ ($0.03 \leq x \leq 0.167$). This solid electrolyte material is synthesized by performing planetary ball milling and burning, and corresponds to the so-called bulk body, and is not a thin membrane.

CITATION LIST

Patent Literature

Patent Literature 1: Japanese Patent Application Laid-Open (JP-A) No. 2009-238704
Patent Literature 2: JP-A No. 2008-059843

Non Patent Literature

Non Patent Literature 1: Jun-Ku Ahn et al., "Characteristics of perovskite $(Li_{0.5}La_{0.5})TiO_3$ solid electrolyte thin films grown by pulsed laser deposition for rechargeable lithium microbattery", Electrochimica Acta 50 (2004) 371-374

SUMMARY OF INVENTION

Technical Problem

A solid electrolyte material having high Li ion conductivity has been demanded from the viewpoint of achieving higher output of a battery. In particular, Li ion conductivity tends to deteriorate in the crystal grain boundary, so that the improvement of Li ion conductivity in the crystal grain boundary needs to be intended. The present invention has been made in view of the above-mentioned actual circumstances, and a main object thereof is to provide a Li—La—Ti—O based solid electrolyte material having high Li ion conductivity in the crystal grain boundary.

Solution to Problem

To solve the above-mentioned problem, the present invention provides a solid electrolyte material represented by a general formula: $Li_{3x}(La_{(2/3-x)-a}M1_a)(Ti_{1-b}M2_b)O_3$, in which "x" is 0<x<0.17; "a" is $0 \leq a \leq 0.5$; "b" is $0 \leq b \leq 0.5$; "M1" is at least one selected from the group consisting of Sr, Na, Nd, Pr, Sm, Gd, Dy, Y, Eu, Tb, and Ba; and "M2" is at least one selected from the group consisting of Mg, W, Mn, Al, Ge, Ru, Nb, Ta, Co, Zr, Hf, Fe, Cr, and Ga, and characterized in that the solid electrolyte material is a crystalline material, is in thin film form, and has a thickness of 250 nm to 850 nm.

A Li—La—Ti—O based solid electrolyte material having high Li ion conductivity in the crystal grain boundary can be obtained for the reason that the solid electrolyte material of the present invention has the above-mentioned general formula, is a crystalline material, is in thin film form, and has a specific thickness. In particular, the solid electrolyte material of the present invention has a thickness of a specific range, so that crystal grains may be favorably joined to each other and Li ion conductivity in the crystal grain boundary may be improved.

In the invention, the "x" preferably satisfies $0.06 \leq x \leq 0.08$. As described in the below-mentioned examples, the reason therefor is a solid electrolyte material having high Li ion conductivity in the crystal grain boundary can be obtained.

In the invention, the "a" and the "b" are preferably 0.

Also, the present invention provides a lithium battery comprising: a cathode active material layer containing a cathode active material, an anode active material layer containing an anode active material, and a solid electrolyte layer formed between the above-mentioned cathode active material layer and the above-mentioned anode active material layer, characterized in that the above-mentioned solid electrolyte layer contains the above-mentioned solid electrolyte material.

According to the present invention, using the above-mentioned solid electrolyte material, a high-output lithium battery can be obtained.

Also, the present invention provides a method of producing a solid electrolyte material, comprising steps of: preparing a raw material, in which the raw material is made of Li, La, Ti, M1 (M1 being at least one selected from the group consisting of Sr, Na, Nd, Pr, Sm, Gd, Dy, Y, Eu, Tb, and Ba), and M2 (M2 being at least one selected from the group consisting of Mg, W, Mn, Al, Ge, Ru, Nb, Ta, Co, Zr, Hf, Fe, Cr, and Ga); forming a thin film, in which a LiLaTiO thin film is formed, using the raw material, to a substrate by a reactive deposition method using an oxygen; and heating the LiLaTiO thin film and forming a solid electrolyte material, in which the solid electrolyte material is represented by a general formula: $Li_{3x}(La_{(2/3-x)-a}M1_a)(Ti_{1-b}M2_b)O_3$, "x" being $0<x<0.17$ and "a" being $0≤a≤0.5$; "b" is $0≤b≤0.5$; and the solid electrolyte material is a crystalline material, is in thin film form, and has a thickness of 250 nm to 850 nm.

According to the present invention, the use of the reactive deposition method allows a minute LiLaTiO thin film to be formed, and the performance of heating treatment allows a solid electrolyte material having high crystallinity to be formed. In addition, the solid electrolyte material has a thickness of a specific range, so that crystal grains may be favorably joined to each other and the Li—La—Ti—O based solid electrolyte material having high Li ion conductivity in the crystal grain boundary can be obtained.

In the invention, the "x" preferably satisfies $0.06≤x≤0.08$. As described in the below-mentioned examples, the reason therefor is that a solid electrolyte material having high Li ion conductivity in the crystal grain boundary can be obtained.

In the invention, the LiLaTiO thin film is preferably formed in the thin film forming step by the reactive deposition method using an oxygen plasma.

In the invention, the substrate is preferably a member containing a cathode active material layer or an anode active material layer. The reason therefor is to be useful for producing a lithium battery.

Advantageous Effects of Invention

The present invention produces the effect such that a Li—La—Ti—O based solid electrolyte material having high Li ion conductivity in the crystal grain boundary can be obtained.

DESCRIPTION OF EMBODIMENTS

A solid electrolyte material, a lithium battery and a method of producing a solid electrolyte material of the present invention are hereinafter described in detail.

A. Solid Electrolyte Material

A solid electrolyte material of the present invention is first described. The solid electrolyte material of the present invention is represented by a general formula: $Li_{3x}(La_{(2/3-x)-a}M1_a)(Ti_{1-b}M2b)O_3$, in which $0<x<0.17$; "a" is $0≤a≤0.5$; "b" is $0≤b≤0.5$; "M1" is at least one selected from the group consisting of Sr, Na, Nd, Pr, Sm, Gd, Dy, Y, Eu, Tb, and Ba; and "M2" is at least one selected from the group consisting of Mg, W, Mn, Al, Ge, Ru, Nb, Ta, Co, Zr, Hf, Fe, Cr, and Ga, and characterized in that the solid electrolyte material is a crystalline material, is in thin film form, and has a thickness of 250 nm to 850 nm.

A Li—La—Ti—O based solid electrolyte material having high Li ion conductivity in the crystal grain boundary can be obtained for the reason that the solid electrolyte material of the present invention has the above-mentioned general formula, is a crystalline material, is in thin film form, and has a specific thickness. In particular, the solid electrolyte material of the present invention has a thickness of a specific range, so that crystal grains may be favorably joined to each other and Li ion conductivity in the crystal grain boundary can be improved.

Figure 1:
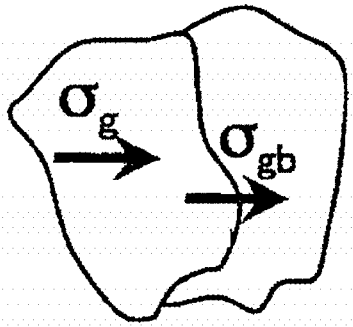
FIG. 1 is a schematic cross-sectional view explaining Li ion conduction in a solid electrolyte material.

FIG. 1 is a schematic cross-sectional view explaining Li ion conduction in a solid electrolyte material. In the case of a crystalline solid electrolyte material, both Li ion conductivity inside the crystal grain ($\sigma_g$) and Li ion conductivity in the crystal grain boundary ($\sigma_{gb}$) need to be considered. In a conventional solid electrolyte material, $\sigma_{gb}$ becomes overwhelmingly smaller than $\sigma_g$. Thus, the crystal grain boundary becomes the bottleneck, and Li ions build up easily in the crystal grain boundary and may not move smoothly, so that a high-output lithium battery is difficult to be obtained. In contrast, the solid electrolyte material of the present invention has a thickness of a specific range, so that crystal grains may be favorably joined to each other. As a result, Li ions are difficult to be built up in the crystal grain boundary and may move smoothly, so that a high-output lithium battery may be obtained.

One characteristic of the solid electrolyte material of the present invention is being a crystalline material. In the above-mentioned Patent Literature 1 and Non Patent Literature 1, the amorphous solid electrolyte material is disclosed. In these Literatures, the point that resistance increase due to the crystal grain boundary may be prevented is described as the advantage in amorphizing the solid electrolyte material. Thus, conventionally, the amorphous solid electrolyte material has been generally formed in consideration of the presence of the grain boundary resistance. In contrast, in the present invention, even in the case of the crystalline solid electrolyte material, it was confirmed that Li ions can be restrained from building up in the crystal grain boundary. It can be confirmed by X-ray diffraction (XRD) that the solid electrolyte material of the present invention is a crystalline material.

Also, one characteristic of the solid electrolyte material of the present invention is being in thin film form. In the above-mentioned Patent Literature 2, the solid electrolyte material as the so-called bulk body is disclosed. With regard to the solid electrolyte material as the bulk body, space is caused so easily between the crystal grains that it is difficult to favorably join the crystal grains to each other. In contrast, in the present invention, the use of the below-mentioned reactive deposition method allows a minute solid electrolyte material in thin film form to be obtained. Thus, it is conceived that the crystal grains may be favorably joined to each other and Li ion conductivity in the crystal grain boundary can be improved.

The thickness of the solid electrolyte material of the present invention is generally 250 nm or more. When the thickness of the solid electrolyte material is smaller than 250 nm, the grain diameter of the obtained crystal grains becomes too small and the joint of the crystal grains to each other becomes insufficient. As a result, it is conceived that Li ions build up so easily in the crystal grain boundary that Li ion conductivity in the crystal grain boundary deteriorates. On the other hand, as described in the below-mentioned examples, when the thickness of the solid electrolyte material is 250 nm or more, Li ion conductivity in the crystal grain boundary improves remarkably. Above all, the thickness of the solid electrolyte material is preferably 300 nm or more, and more preferably 350 nm or more. The reason therefor is to further improve Li ion conductivity in the crystal grain boundary.

Meanwhile, the thickness of the solid electrolyte material is generally 850 nm or less. When the thickness of the solid electrolyte material is larger than 850 nm, the grain diameter of the obtained crystal grains becomes too large and the joint of the crystal grains to each other becomes insufficient. As a result, it is conceived that Li ions build up so easily in the crystal grain boundary that Li ion conductivity in the crystal grain boundary deteriorates. Above all, the thickness of the solid electrolyte material is preferably 800 nm or less, more preferably 750 nm or less, and far more preferably 650 nm or less. The reason therefor is to further improve Li ion conductivity in the crystal grain boundary.

Also, the average grain diameter of the crystal grains contained in the solid electrolyte material is, although not particularly limited, for example, preferably 10 nm to 100 nm, and more preferably 20 nm to 80 nm. The average grain diameter of the crystal grains may be calculated by observing with a scanning electron microscope (SEM).

Also, the solid electrolyte material of the present invention is represented by $Li_{3x}(La_{(2/3-x)-a}M1_a)(Ti_{1-b}M2_b)O_3$. In the above-mentioned general formula, "x" is $0<x<0.17$. In the present invention, "x" is preferably $0.05 \leq x$, and more preferably $0.06 \leq x$. As described in the below-mentioned examples, the reason therefor is a solid electrolyte material having high Li ion conductivity in the crystal grain boundary can be obtained. On the other hand, in the present invention, "x" is generally smaller than 0.17. As described in the below-mentioned comparative examples, the reason therefor is a solid electrolyte material having high Li ion conductivity in the crystal grain boundary cannot be obtained when "x" is 0.17 or more. Above all, in the present invention, "x" is preferably $x \leq 0.16$, more preferably $x \leq 0.10$, and far more preferably $x \leq 0.08$.

Also, in the above-mentioned general formula, "a" is $0 \leq a \leq 0.5$. The reason why the upper limit of "a" is prescribed at 0.5 is that when "a" is more than 0.5, the ratio of La relatively decreases and a stable perovskite type structure may not be formed. Also, in the above-mentioned general formula, "b" is $0 \leq b \leq 0.5$. The reason why the upper limit of "b" is prescribed at 0.5 is the same as the case of "a". Also, in the present invention, "a" or "b" may be 0, or alternatively, "a" and "b" may be 0.

Also, in the above-mentioned general formula, "M1" is a metal capable of being located at the same site as La in the crystal structure; specifically, at least one selected from the group consisting of Sr, Na, Nd, Pr, Sm, Gd, Dy, Y, Eu, Tb, and Ba.

Also, in the above-mentioned general formula, "M2" is a metal capable of being located at the same site as Ti in the crystal structure; specifically, at least one selected from the group consisting of Mg, W, Mn, Al, Ge, Ru, Nb, Ta, Co, Zr, Hf, Fe, Cr, and Ga.

The solid electrolyte material of the present invention is generally a crystalline material. Also, the solid electrolyte material of the present invention preferably has a perovskite type structure. The reason therefor is to allow a solid electrolyte material having high Li ion conductivity. In particular, the solid electrolyte material of the present invention is preferably a single-phase compound having a perovskite type structure. The reason therefor is to allow Li ion conductivity to be further improved.

In the present invention, the ratio ($\sigma_{gb}/\sigma_g$) of Li ion conductivity in the crystal grain boundary ($\sigma_{gb}$) to Li ion conductivity inside the crystal grain ($\sigma_g$) is preferably higher. Specifically, $\sigma_{gb}/\sigma_g$ is preferably 0.09 or more, more preferably 0.20 or more, far more preferably 0.80 or more, and particularly preferably 1.0 or more. In addition, the solid electrolyte material of the present invention may be used for optional uses in which Li ion conductivity is required. Examples of the uses of the solid electrolyte material include batteries such as a lithium battery and sensors such as a gas sensor. A method of producing the solid electrolyte material of the present invention is described in detail in the below-mentioned 'C. Method of producing solid electrolyte material'.

B. Lithium Battery

Next, a lithium battery of the present invention is described. The lithium battery of the present invention is a lithium battery comprising: a cathode active material layer containing a cathode active material, an anode active material layer containing an anode active material, and a solid electrolyte layer formed between the above-mentioned cathode active material layer and the above-mentioned anode active material layer, characterized in that the above-mentioned solid electrolyte layer contains the above-mentioned solid electrolyte material.

According to the present invention, using the above-mentioned solid electrolyte material, a high-output lithium battery can be obtained.

Figure 2:
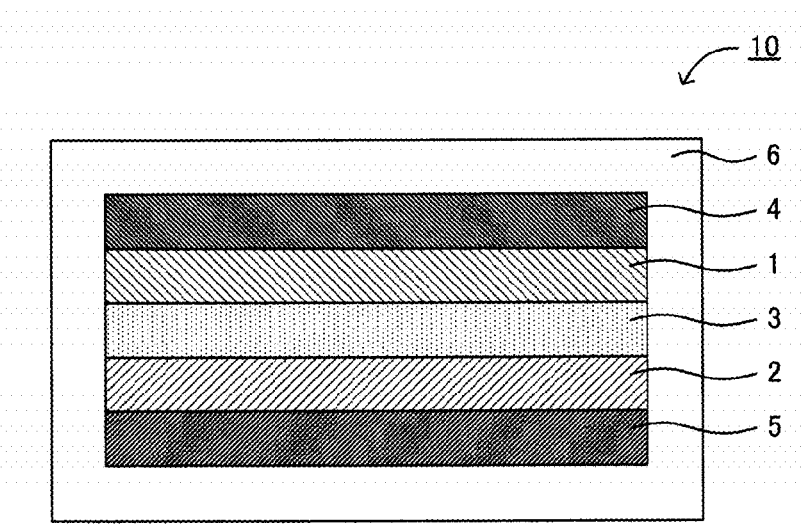
FIG. 2 is a schematic cross-sectional view showing an example of a lithium battery of the present invention.

FIG. 2 is a schematic cross-sectional view showing an example of a lithium battery of the present invention. A lithium battery 10 in FIG. 2 comprises: a cathode active material layer 1 containing a cathode active material, an anode active material layer 2 containing an anode active material, a solid electrolyte layer 3 formed between the cathode active material layer 1 and the anode active material layer 2, a cathode current collector 4 for performing current collecting of the cathode active material layer 1, an anode current collector 5 for performing current collecting of the anode active material layer 2, and a battery case 6 for storing these members. The present invention is greatly characterized in that the solid electrolyte layer 3 contains the solid electrolyte material described in the above-mentioned 'A. Solid electrolyte material'.

The lithium battery of the present invention is hereinafter described in each constitution.

1. Solid Electrolyte Layer

A solid electrolyte layer in the present invention is first described. The solid electrolyte layer in the present invention contains the above-mentioned solid electrolyte material. The range of the thickness of the solid electrolyte layer is preferably the same as the range of the thickness of the above-mentioned solid electrolyte material.

2. Cathode Active Material Layer

Next, a cathode active material layer in the present invention is described. The cathode active material layer in the present invention is a layer containing at least a cathode active material, and may contain at least one of a conductive material, a solid electrolyte material and a binder, as required. Examples of the cathode active material include $LiCoO_2$, $LiMnO_2$, $Li_2NiMn_3O_8$, $LiVO_2$, $LiCrO_2$, $LiFePO_4$, $LiCoPO_4$, $LiNiO_2$ and $LiNi_{1/3}Co_{1/3}Mn_{1/3}O_2$.

The cathode active material layer in the present invention may further contain a conductive material. The addition of the conductive material allows conductivity of the cathode active material layer to be improved. Examples of the conductive material include acetylene black, Ketjen Black and carbon fiber. Also, the cathode active material layer may further contain a solid electrolyte material. The addition of the solid electrolyte material allows Li ion conductivity of the cathode active material layer to be improved. Examples of the solid electrolyte material include an oxide solid electrolyte material and a sulfide solid electrolyte material. Also, the cathode active material layer may further contain a binder. Examples of the binder include a fluorine-containing binder such as polytetrafluoroethylene (PTFE). The thickness of the cathode active material layer is preferably within a range of 0.1 μm to 1000 μm, for example.

3. Anode Active Material Layer

Next, an anode active material layer in the present invention is described. The anode active material layer in the present invention is a layer containing at least an anode active material, and may contain at least one of a conductive material, a solid electrolyte material and a binder, as required. Examples of the anode active material include a metal active material and a carbon active material. Examples of the metal active material include In, Al, Si, and Sn. On the other hand, examples of the carbon active material include mesocarbon microbeads (MCMB), high orientation property graphite (HOPG), hard carbon and soft carbon.

A conductive material, a solid electrolyte material and a binder used for the anode active material layer are the same as the case of the above-mentioned cathode active material layer. The thickness of the anode active material layer is preferably within a range of 0.1 μm to 1000 μm, for example.

4. Other Constitutions

The lithium battery of the present invention comprises at least the above-mentioned solid electrolyte layer, cathode active material layer and anode active material layer, and generally further comprises a cathode current collector for performing current collecting of the cathode active material layer and an anode current collector for performing current collecting of the anode active material layer. Examples of a material for the cathode current collector include SUS, aluminum, nickel, iron, titanium and carbon, and preferably SUS among them. On the other hand, examples of a material for the anode current collector include SUS, copper, nickel and carbon, and preferably SUS among them. The thickness and shape of the cathode current collector and the anode current collector are preferably selected properly in accordance with factors such as uses of a lithium battery. A battery case of a general lithium battery may be used for a battery case used for the present invention. Examples of the battery case include a battery case made of SUS.

5. Lithium Battery

The lithium battery of the present invention may be a primary battery or a secondary battery, and is preferably a secondary battery. The reason therefor is to be repeatedly chargeable and dischargeable and be useful as a car-mounted battery, for example. Examples of the shape of the lithium battery of the present invention include a coin shape, a laminate shape, a cylindrical shape and a rectangular shape. A method of producing the lithium battery of the present invention is not particularly limited if it is a method for allowing the above-mentioned lithium battery, and the same method as a method of producing a general lithium battery may be used. Examples thereof include a method such that a material composing a cathode active material layer, a material composing a solid electrolyte layer and a material composing an anode active material layer are sequentially pressed to thereby produce a power generating element, and this power generating element is stored inside a battery case, which is crimped.

C. Method of Producing Solid Electrolyte Material

Next, a method of producing a solid electrolyte material of the present invention is described. The method of producing a solid electrolyte material of the present invention comprises steps of: preparing a raw material, in which the raw material is made of Li, La, Ti, M1 (M1 being at least one selected from the group consisting of Sr, Na, Nd, Pr, Sm, Gd, Dy, Y, Eu, Tb, and Ba), and M2 (M2 being at least one selected from the group consisting of Mg, W, Mn, Al, Ge, Ru, Nb, Ta, Co, Zr, Hf, Fe, Cr, and Ga); forming a thin film, in which a LiLaTiO thin film is formed, using the raw material, to a substrate by a reactive deposition method using oxygen; and heating the LiLaTiO thin film and forming a solid electrolyte material, in which the solid electrolyte material is represented by a general formula: $Li_{3x}(La_{(2/3-x)-a}M1_a)(Ti_{1-b}M2_b)O_3$, "x" being $0<x<0.17$ and "a" being $0 \le a \le 0.5$; "b" is $0 \le b \le 0.5$, and the solid electrolyte material is a crystalline material, is in thin film form, and has a thickness of 250 nm to 850 nm.

According to the present invention, the use of the reactive deposition method allows a minute LiLaTiO thin film to be formed, and the performance of heating treatment allows a solid electrolyte material having high crystallinity to be formed. In addition, the solid electrolyte material has a thickness of a specific range, so that crystal grains can be favorably joined to each other and the Li—La—Ti—O based solid electrolyte material having high Li ion conductivity in the crystal grain boundary can be obtained.

Figure 3:
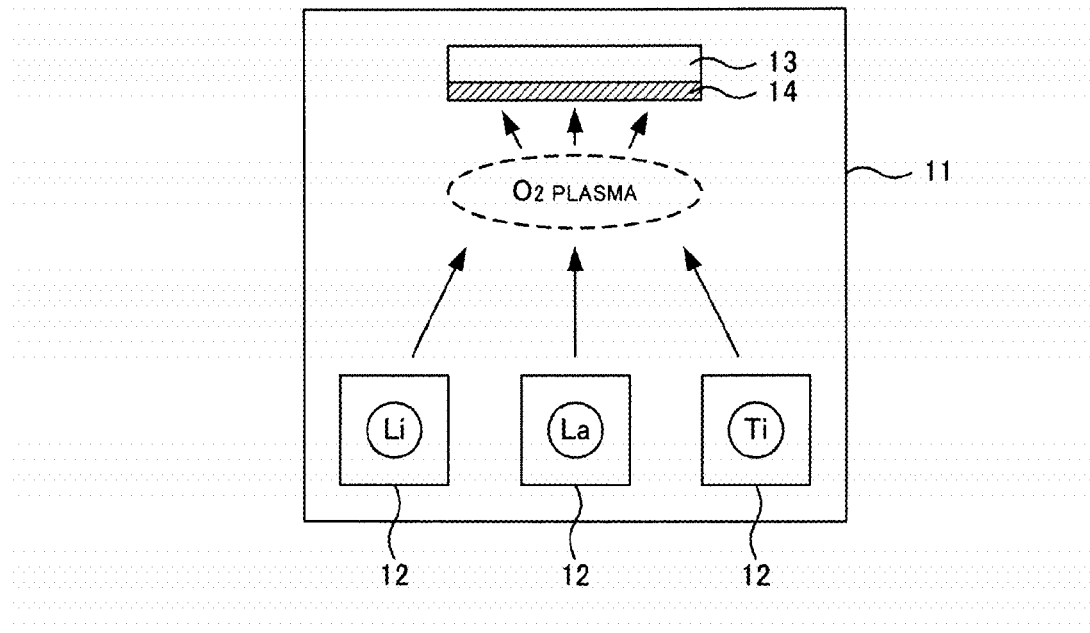
FIG. 3 is a schematic cross-sectional view showing an example of a method of producing a solid electrolyte material of the present invention.

FIG. 3 is a schematic cross-sectional view showing an example of a method of producing a solid electrolyte material of the present invention. In FIG. 3, a crucible 12 in which Li metal, La metal and Ti metal are put, and a substrate 13 are first placed in a chamber 11, Next, the pressure of the chamber 11 is reduced to form a vacuum state. Thereafter, an $O_2$ plasma is caused to simultaneously volatilize Li metal, La metal and Ti metal by a resistance heating method and an electron beam method. Thus, a LiLaTiO thin film 14 is deposited on the substrate 13. Thereafter, the substrate 13 with the LiLaTiO thin film 14 deposited thereon is heated in the air to thereby form a crystalline solid electrolyte material in thin film form out of the LiLaTiO thin film 14.

A method of producing a solid electrolyte material of the present invention is hereinafter described in each step.

1. Raw Material Preparing Step

The raw material preparing step in the present invention is first described. The raw material preparing step in the present invention is a step of preparing a raw material, in which the raw material is made of Li, La, Ti, M1 (M1 being at least one selected from the group consisting of Sr, Na, Nd, Pr, Sm, Gd, Dy, Y, Eu, Tb, and Ba), and M2 (M2 being at least one selected from the group consisting of Mg, W, Mn, Al, Ge, Ru, Nb, Ta, Co, Zr, Hf, Fe, Cr, and Ga).

In the present invention, simplex metals of Li, La, Ti, M1 and M2 are generally prepared. These simplex metals are preferably high in purity. The reason therefor is a solid electrolyte material with fewer impurities can be obtained. Also, generally, M1 is not used in the case of obtaining a solid electrolyte material such that "a" in the above-mentioned general formula is 0, and M2 is not used in the case of obtaining a solid electrolyte material such that "b" in the above-mentioned general formula is 0.

2. Thin Film Forming Step

Next, the thin film forming step in the present invention is described. The thin film forming step in the present invention is a step of forming a LiLaTiO thin film while using the above-mentioned raw material to a substrate by a reactive deposition method using oxygen.

In the present invention, the LiLaTiO thin film is formed by a reactive deposition method. In this method, the LiLaTiO thin film is formed by volatilizing the raw material to react the volatilized raw material with oxygen. Examples of a method of volatilizing the raw material include a resistance heating method and an electron beam method. Examples of a method of reacting the volatilized raw material with oxygen include a method of using an oxygen plasma and a method of using oxygen gas. In addition, in the present invention, the reactive deposition is preferably performed in vacuo, and is preferably performed specifically in a vacuum of $1 \times 10^{-10}$ mBar or less. The reason therefor is that a minute thin film may be formed. The thickness of the LiLaTiO thin film can be controlled by deposition time.

Also, in the present invention, the LiLaTiO thin film is formed on the substrate. The substrate in the present invention is not particularly limited and preferably selected properly in accordance with uses of the solid electrolyte material. For example, in the case of using the solid electrolyte material as a solid electrolyte layer of a lithium battery, a member having a cathode active material layer or an anode active material layer is preferably used as the substrate.

3. Heating Step

Next, the heating step in the present invention is described. The heating step in the present invention is a step of heating the LiLaTiO thin film and forming a solid electrolyte material, in which the solid electrolyte material is represented by a general formula: $Li_{3x}(La_{(2/3-x)-a}M1_a)(Ti_{1-b}M2_b)O_3$, "x" being $0<x<0.17$ and "a" being $0 \le a \le 0.5$; "b" is $0 \le b \le 0.5$, and the solid electrolyte material is a crystalline material, is in thin film form, and has a thickness of 250 nm to 850 nm.

In the present invention, the heating of the LiLaTiO thin film allows the solid electrolyte material with a crystal phase represented by the above-mentioned general formula to be obtained. Heating temperature is preferably a temperature of crystallizing temperature or more of a crystal phase represented by the above-mentioned general formula; for example, within a range of 600° C. to 900° C. Heating time is preferably within a range of 0.5 hour to 6 hours, for example. Also, examples of a method of heating the LiLaTiO thin film include a method by using a baking furnace. In addition, an atmosphere for heating the LiLaTiO thin film may be an air atmosphere or an inert gas atmosphere.

Also, in the present invention, heating step may be performed after thin film forming step, or simultaneously with thin film forming step. In the case of the latter, the substrate is preferably heated to a desired temperature during the thin film formation.

3. Others

A solid electrolyte material obtained by the present invention is the same as the contents described in the above-mentioned 'A. Solid electrolyte material'; therefore, the description herein is omitted. The present invention can provide a solid electrolyte material characterized by being obtained by the above-mentioned method of producing a solid electrolyte material.

The present invention is not limited to the above-mentioned embodiments. The above-mentioned embodiments are exemplification, and any is included in the technical scope of the present invention if it has substantially the same constitution as the technical idea described in the scope of the claims of the present invention and offers similar operation and effect thereto.

EXAMPLES

The present invention is described more specifically while showing examples hereinafter.

Example 1-1

Lithium metal (ribbon, a purity of 99.9%, manufactured by Sigma-Aldrich Co. LLC.), lanthanum metal (a purity of 99.9%, manufactured by Sigma-Aldrich Co. LLC.), and titanium metal (slug, a purity of 99.98%, manufactured by Alfa Aesar) were first prepared as a raw material. Next, the lithium metal was put in a 40 cm$^3$ crucible made of pyrolytic boron nitride (PBN) and placed in a chamber. Next, the lanthanum metal and the titanium metal were each put in a 40 cm$^3$ crucible made of pyrolytic graphite and placed in the chamber in the same manner. A Si/SiO$_2$/Ti/Pt laminated body (manufactured by NOVA Electronic Materials, LLC.) was used as a substrate, a deposition area was determined at 0.785 cm$^2$ (equivalent to $\phi$ 10 mm), and a distance from the raw material to the substrate was determined at 500 mm. Next, the inside of the chamber was subject to a high vacuum of $1 \times 10^{-10}$ mBar or less.

Thereafter, resistance heating (Knudsen Cells) was performed for the crucible in which the lithium metal was put to volatilize the lithium, and simultaneously electron beam irradiation was performed for the crucible in which the lanthanum metal was put and the crucible in which the titanium metal was put to volatilize the lanthanum metal and the titanium metal. An oxygen plasma was caused in the chamber by using an oxygen plasma generator (manufactured by Oxford Applied Research Ltd., RF source, HD25™) and reacted with the volatilized raw material to thereby deposit a LiLaTiO thin film on the substrate. Deposition time was 60 minutes.

Thereafter, the LiLaTiO thin film deposited on the substrate was heated in the air on the conditions of 750° C. and 3 hours to obtain a solid electrolyte material in thin film form (a thickness of 250 nm). When XRD measurement (CuKα used) was performed for the obtained solid electrolyte material, it was confirmed that the solid electrolyte material was a crystalline material. Also, when ICP analysis (inductively coupled plasma analysis) was performed for the obtained solid electrolyte material, the composition thereof was $Li_{0.18}La_{0.61}TiO_3$ (x=0.06). Through these results, it was confirmed that the obtained solid electrolyte material had a perovskite type structure.

Examples 1-2 to 1-4

A solid electrolyte material in thin film form was obtained in the same manner as Example 1-1 except for properly modifying the deposition time. The thickness of the solid electrolyte materials obtained in Examples 1-2 to 1-4 was 450 nm, 650 nm and 850 nm, respectively.

Comparative Examples 1-1 and 1-2

A solid electrolyte material in thin film form was obtained in the same manner as Example 1-1 except for properly modifying the deposition time. The thickness of the solid electrolyte materials obtained in Comparative Examples 1-1 and 1-2 was 50 nm and 1050 nm, respectively.

[Evaluation 1]

Li ion conductivity of the solid electrolyte materials obtained in Examples 1-1 to 1-4 and Comparative Examples 1-1 and 1-2 was evaluated. Platinum was first deposited on the surface of the solid electrolyte material formed on the substrate to produce a symmetrical cell of Pt/solid electrolyte material/Pt. Next, Li ion conductivity inside the crystal grain ($\sigma_g$) and Li ion conductivity in the crystal grain boundary ($\sigma_{gb}$) were measured by an alternating current impedance method to calculate $\sigma_{gb}/\sigma_g$. The result is shown in Table 1 and FIG. 4.

TABLE 1

|  | Chemical Formula | Thickness | $\sigma_{gb}/\sigma_g$ |
|---|---|---|---|
| Comparative Example 1-1 | $Li_{0.18}La_{0.61}TiO_3$ (x = 0.06) | 50 nm | 0.11 |
| Example 1-1 |  | 250 nm | 1.02 |
| Example 1-2 |  | 450 nm | 1.10 |
| Example 1-3 |  | 650 nm | 1.01 |
| Example 1-4 |  | 850 nm | 0.51 |
| Comparative Example 1-2 |  | 1050 nm | 0.12 |

Figure 4:
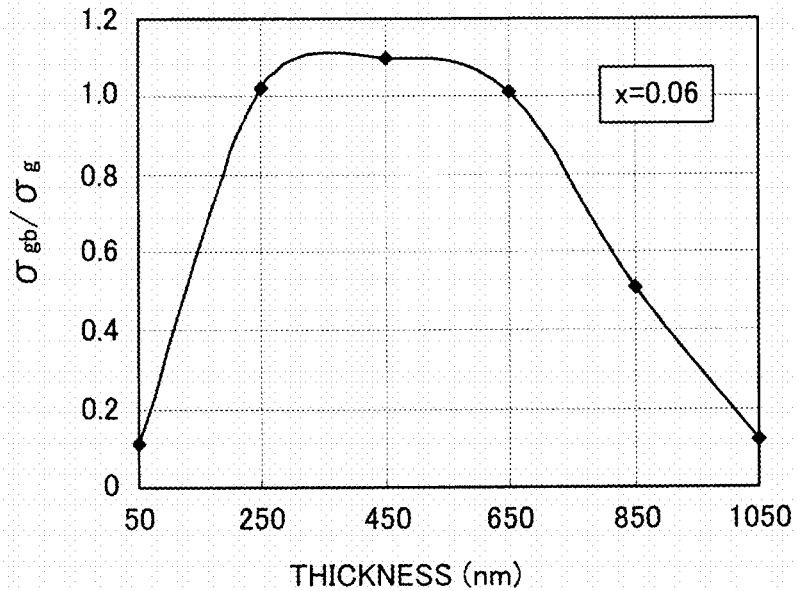
FIG. 4 is a result of measuring Li ion conductivity of each of solid electrolyte materials obtained in Examples 1-1 to 1-4 and Comparative Examples 1-1 and 1-2.

As shown in Table 1 and FIG. 4, in the case where the thickness was within a range of 250 nm to 850 nm, it was confirmed that $\sigma_{gb}/\sigma_g$ increased. In particular, in the case where the thickness was within a range of 250 nm to 650 nm, it was confirmed that $\sigma_{gb}/\sigma_g$ increased remarkably.

Example 2-1

A solid electrolyte material in thin film form was obtained in the same manner as Example 1-1 except for properly adjusting the amount of the metals volatilized from the crucible with a shutter. The composition of the solid electrolyte material obtained in Example 2-1 was $Li_{0.24}La_{0.59}TiO_3$ (x=0.08) and the thickness thereof was 250 nm.

Examples 2-2 to 2-4

A solid electrolyte material in thin film form was obtained in the same manner as Example 2-1 except for properly modifying the deposition time. The thickness of the solid electrolyte materials obtained in Examples 2-2 to 2-4 was 450 nm, 650 nm and 850 nm, respectively.

Comparative Examples 2-1 and 2-2

A solid electrolyte material in thin film form was obtained in the same manner as Example 2-1 except for properly modifying the deposition time. The thickness of the solid electrolyte materials obtained in Comparative Examples 2-1 and 2-2 was 50 nm and 1050 nm, respectively.

[Evaluation 2]

$\sigma_{gb}/\sigma_g$ of the solid electrolyte materials obtained in Examples 2-1 to 2-4 and Comparative Examples 2-1 and 2-2 was calculated. The measuring method is the same as the above-mentioned Evaluation 1. The result is shown in Table 2 and FIG. 5.

TABLE 2

|  | Chemical Formula | Thickness | $\sigma_{gb}/\sigma_g$ |
|---|---|---|---|
| Comparative Example 2-1 | $Li_{0.24}La_{0.59}TiO_3$ (x = 0.08) | 50 nm | 0.06 |
| Example 2-1 |  | 250 nm | 0.31 |
| Example 2-2 |  | 450 nm | 0.83 |
| Example 2-3 |  | 650 nm | 0.21 |
| Example 2-4 |  | 850 nm | 0.09 |
| Comparative Example 2-2 |  | 1050 nm | 0.01 |

Figure 5:
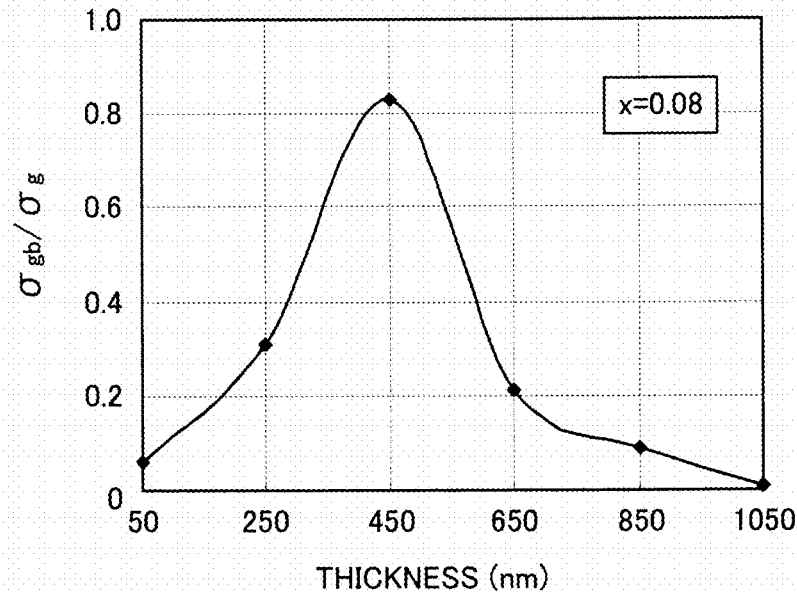
FIG. 5 is a result of measuring Li ion conductivity of each of solid electrolyte materials obtained in Examples 2-1 to 2-4 and Comparative Examples 2-1 and 2-2.

As shown in Table 2 and FIG. 5, in the case where the thickness was within a range of 250 nm to 850 nm, it was confirmed that $\sigma_{gb}/\sigma_g$ increased. In particular, in the case where the thickness was within a range of 250 nm to 600 nm, in addition, in the case where the thickness was within a range of 300 nm to 550 nm, it was confirmed that $\sigma_{gb}/\sigma_g$ increased remarkably.

Comparative Example 3-1

A solid electrolyte material in thin film form was obtained in the same manner as Example 1-1 except for properly adjusting the amount of the metals volatilized from the crucible with a shutter. The composition of the solid electrolyte material obtained in Comparative Example 3-1 was $Li_{0.50}La_{0.50}TiO_3$ (x=0.17) and the thickness thereof was 50 nm.

Comparative Examples 3-2 to 3-6

A solid electrolyte material in thin film form was obtained in the same manner as Comparative Example 3-1 except for properly modifying the deposition time. The thickness of the solid electrolyte materials obtained in Comparative Examples 3-2 to 3-6 was 250 nm, 450 nm, 650 nm, 850 nm and 1050 nm, respectively.

[Evaluation 3]

$\sigma_{gb}/\sigma_g$ of the solid electrolyte materials obtained in Comparative Examples 3-1 to 3-6 was calculated. The measuring method is the same as the above-mentioned Evaluation 1. The result is shown in Table 3 and FIG. 6.

TABLE 3

|  | Chemical Formula | Thickness | $\sigma_{gb}/\sigma_g$ |
|---|---|---|---|
| Comparative Example 3-1 | $Li_{0.50}La_{0.50}TiO_3$ (x = 0.17) | 50 nm | 0.10 |
| Comparative Example 3-2 |  | 250 nm | 0.10 |
| Comparative Example 3-3 |  | 450 nm | 0.06 |
| Comparative Example 3-4 |  | 650 nm | 0.07 |
| Comparative Example 3-5 |  | 850 nm | 0.07 |
| Comparative Example 3-6 |  | 1050 nm | 0.10 |

Figure 6:
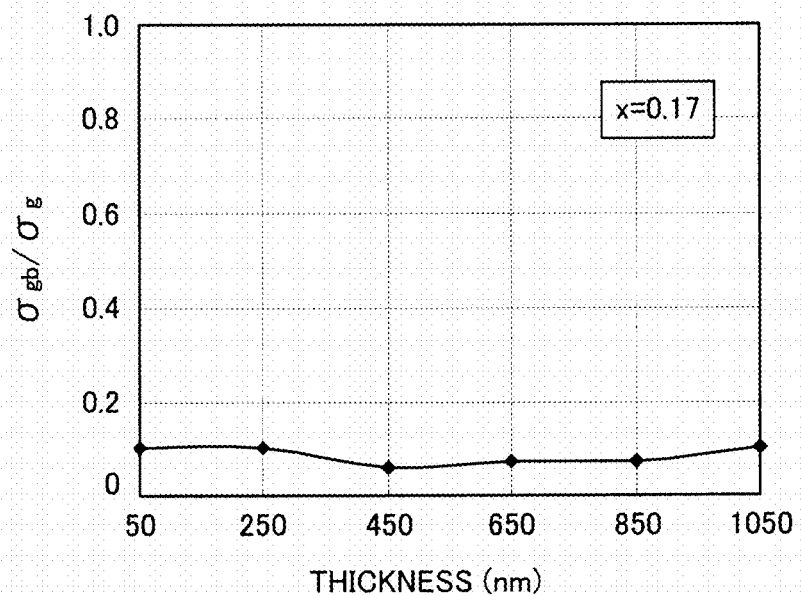
FIG. 6 is a result of measuring Li ion conductivity of each of solid electrolyte materials obtained in Comparative Examples 3-1 and 3-6.

As shown in Table 3 and FIG. 6, in the case of x=0.17, the change of $\sigma_{gb}/\sigma_g$ by a difference in the thickness was not confirmed and any of $\sigma_{gb}/\sigma_g$ was a low value. The reason therefor is not completely clear and is conceived to be that the joint of crystal grains in the crystal grain boundary is probably weak.

Reference Example

Figure 7:
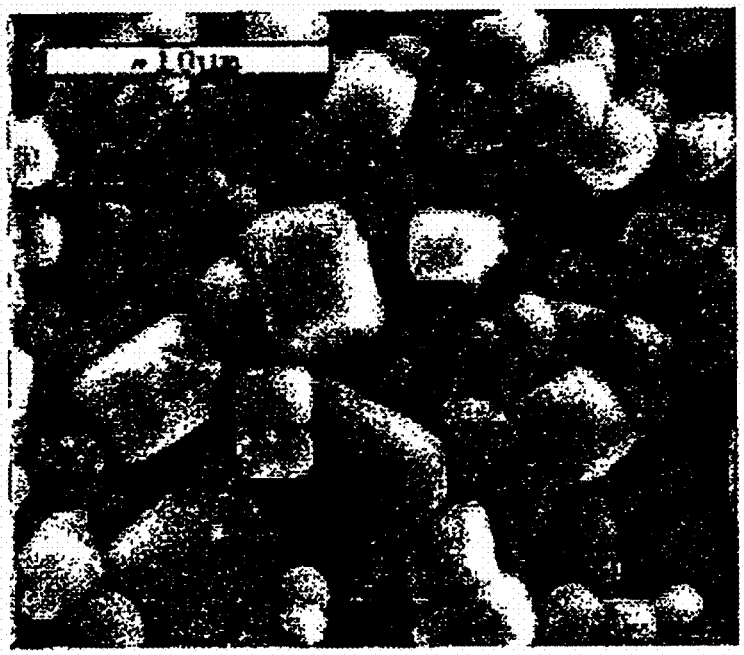
FIG. 7 is an SEM photograph of a surface of a conventional solid electrolyte material.
Figure 8:
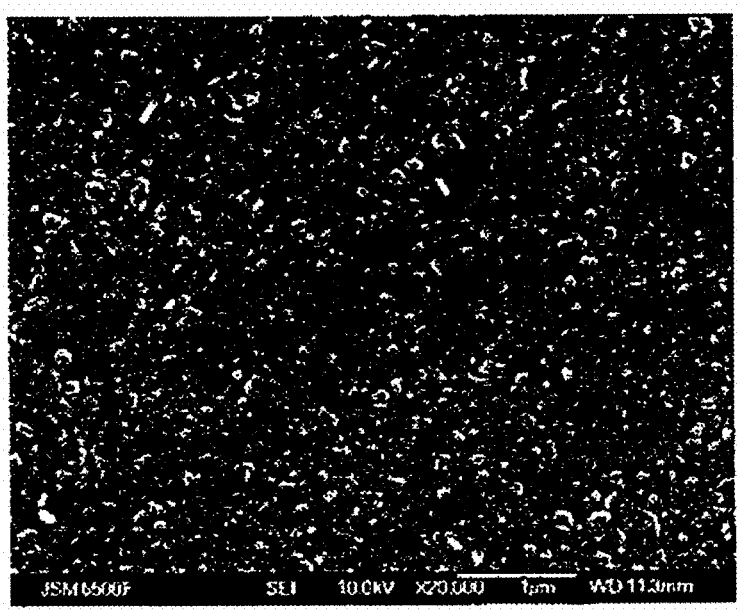
FIG. 8 is an SEM photograph of a surface of a solid electrolyte material of the present invention.

A solid electrolyte material as a bulk body was synthesized by the same method as Patent Literature 2. First, $Li_2CO_3$, $La_2O_3$ and $TiO_2$ were mixed at a molar ratio of 1:1:4, mixed for 2 hours by planetary ball milling while using an acetone solvent, and thereafter dried. Next, the mixture was heated at a temperature of 800° C. for 4 hours and subsequently heated at a temperature of 1150° C. for 12 hours. Next, the obtained test sample was ground, molded at a pressure of 1 MPa, and thereafter heated at a temperature of 1350° C. for 6 hours. Thus, a solid electrolyte material as a sintered bulk body was obtained. An SEM photograph of the surface of the obtained solid electrolyte material is shown in FIG. 7. On the other hand, an SEM photograph of the surface of the solid electrolyte material obtained in Example 1-1 is shown in FIG. 8. As shown in FIG. 7, with regard to the solid electrolyte material as a sintered bulk body, the joint of the crystal grains to each other is insufficient and the crystal grain boundary becomes the bottleneck. As a result, it is conceived that Li ions build up easily in the crystal grain boundary and may not move smoothly. On the contrary, as shown in FIG. 8, with regard to the solid electrolyte material of the present invention, the joint of the crystal grains to each other is favorable. As a result, it is conceived that Li ions do not build up in the crystal grain boundary and may move smoothly. Thus, with regard to the solid electrolyte material of the present invention, it is conceived that the joint of the crystal grains to each other is so favorable as to improve Li ion conductivity in the crystal grain boundary.

REFERENCE SIGNS LIST 1 cathode active material layer
2 anode active material layer
3 solid electrolyte layer
4 cathode current collector
5 anode current collector
6 battery case
10 lithium battery
11 chamber
12 crucible
13 substrate
14 LiLaTiO thin film

The invention claimed is:
1. A solid electrolyte thin film of formula (I):

$$Li_{3x}(La_{(2/3-x)-a}M1_a)(Ti_{1-b}M2_b)O_3 \qquad (I),$$

wherein:
x is 0<x<0.17;
a is 0≤a≤0.5;
b is 0≤b≤0.5;
M1 is at least one selected from the group consisting of Sr, Na, Nd, Pr, Sm, Gd, Dy, Y, Eu, Tb, and Ba; and
M2 is at least one selected from the group consisting of Mg, W, Mn, Al, Ge, Ru, Nb, Ta, Co, Zr, Hf, Fe, Cr, and Ga,
wherein the solid electrolyte thin film consists of a crystalline material, and has a thickness of 250 nm to 850 nm.

2. The solid electrolyte thin film of claim 1, wherein x is 0.06≤x≤0.08.

3. The solid electrolyte thin film of claim 1, wherein a and b are 0.

4. A lithium battery, comprising:
a cathode active material layer comprising a cathode active material;
an anode active material layer comprising an anode active material; and
a solid electrolyte layer formed between the cathode active material layer and the anode active material layer,
wherein the solid electrolyte layer consists of the solid electrolyte thin film of claim 1.

5. The lithium battery of claim 4, wherein the solid electrolyte thin film has a thickness of 250 nm to 600 nm.

6. The lithium battery of claim 5, wherein one surface of the solid electrolyte layer contacts the cathode active material layer, and the other surface of the solid electrolyte layer contacts the anode active material layer.

7. The solid electrolyte thin film of claim 1, having a thickness of 300 nm to 750 nm.

8. The solid electrolyte thin film of claim 1, having a thickness of 350 nm to 650 nm.

9. The solid electrolyte thin film of claim 1, having a thickness of 250 nm to 600 nm.

10. A method for producing a solid electrolyte thin film, the method comprising:
forming a LiLaTiO thin film on a substrate by reactive deposition of a raw material comprising Li, La, Ti, a component M1 comprising at least one selected from the group consisting of Sr, Na, Nd, Pr, Sm, Gd, Dy, Y, Eu, Tb, and Ba, and a component M2 comprising at least one selected from the group consisting of Mg, W, Mn, Al, Ge, Ru, Nb, Ta, Co, Zr, Hf, Fe, Cr, and Ga with oxygen; and
heating the LiLaTiO thin film, to obtain a solid electrolyte thin film of formula (I):

$$Li_{3x}(La_{(2/3-x)-a}M1_a)(Ti_{1-b}M2_b)O_3 \qquad (I),$$

wherein:
x is 0<x<0.17;
a is 0≤a≤0.5; and
b is 0≤b≤0.5,
wherein the solid electrolyte thin film consists of a crystalline material, and has a thickness of 250 nm to 850 nm.

11. The method of claim 10, wherein x is 0.06≤x≤0.08.

12. The method of claim 10, wherein the reactive deposition employs an oxygen plasma.

13. The method of claim 10, wherein the substrate is a member comprising a cathode active material layer or an anode active material layer.

14. The method of claim 10, wherein the solid electrolyte thin film has a thickness of 300 nm to 750 nm.

15. The method of claim 10, wherein the solid electrolyte thin film has a thickness of 350 nm to 650 nm.

16. The method of claim 10, wherein the heating is carried out at a temperature in a range from 600 to 900° C.

17. The method of claim 10, wherein the heating is carried out for a time from 0.5 to 6 hours.

18. The method of claim 10, wherein the substrate is a member comprising a cathode active material layer.

19. The method of claim 10, wherein the substrate is a member comprising an anode active material layer.

20. The method of claim 10, wherein the solid electrolyte thin film has a thickness of 250 nm to 600 nm.

* * * * *